(12) United States Patent
Atkins et al.

(10) Patent No.: US 12,117,353 B2
(45) Date of Patent: Oct. 15, 2024

(54) VAPORIZER HEATER AND TEMPERATURE SENSING ELEMENT

(71) Applicant: JUUL Labs, Inc., San Francisco, CA (US)

(72) Inventors: Ariel Atkins, San Francisco, CA (US); Val Valentine, San Francisco, CA (US)

(73) Assignee: JUUL Labs, Inc., San Francisco, CA (US)

( * ) Notice: Subject to any disclaimer, the term of this patent is extended or adjusted under 35 U.S.C. 154(b) by 601 days.

(21) Appl. No.: 16/660,657

(22) Filed: Oct. 22, 2019

(65) Prior Publication Data
US 2020/0120993 A1   Apr. 23, 2020

Related U.S. Application Data

(60) Provisional application No. 62/749,009, filed on Oct. 22, 2018.

(51) Int. Cl.
| | | |
|---|---|---|
| *G01K 7/02* | (2021.01) | |
| *H05B 1/02* | (2006.01) | |
| *H05B 3/03* | (2006.01) | |
| *H05B 3/06* | (2006.01) | |

(52) U.S. Cl.
CPC ............ *G01K 7/02* (2013.01); *H05B 1/0297* (2013.01); *H05B 3/03* (2013.01); *H05B 3/06* (2013.01)

(58) Field of Classification Search
CPC .......... A24F 40/46; A24F 40/51; A24F 40/57; G01K 1/143; G01K 7/02; G01K 7/16; H05B 1/0297; H05B 3/03; H05B 3/06
See application file for complete search history.

(56) References Cited

U.S. PATENT DOCUMENTS

| | | |
|---|---|---|
| 8,387,612 B2 | 3/2013 | Damani et al. |
| 9,999,250 B2 | 6/2018 | Minskoff et al. |
| 10,045,568 B2 | 8/2018 | Monsees et al. |
| 10,058,130 B2 | 8/2018 | Monsees et al. |

(Continued)

FOREIGN PATENT DOCUMENTS

| | | |
|---|---|---|
| CN | 100381083 C | 11/2004 |
| CN | 102264249 A | 11/2011 |

(Continued)

*Primary Examiner* — Dana Ross
*Assistant Examiner* — Joe E Mills, Jr.
(74) *Attorney, Agent, or Firm* — Mintz Levin Cohn Ferris Glovsky and Popeo, P.C.

(57) ABSTRACT

Various embodiments of a heating and temperature sensing assembly of a vaporizer device are described herein. In some embodiments, the heating and temperature sensing assembly may include a support plate made out of a thermally conductive material. The heating and temperature sensing assembly may include a heating element including a first electrically conductive pathway extending along the support plate. The heating element may be configured to heat the support plate for heating the vaporizable material. The heating and temperature sensing assembly may include a temperature sensing element having a second electrically conductive pathway extending along the support plate. The temperature sensing element may be configured to sense a temperature of the support plate. Related systems, methods, and articles of manufacture are also described.

19 Claims, 2 Drawing Sheets

(56) References Cited

U.S. PATENT DOCUMENTS

| | | |
|---|---|---|
| 10,076,139 B2 | 9/2018 | Monsees et al. |
| 10,085,486 B2 | 10/2018 | Cameron |
| 10,104,915 B2 | 10/2018 | Bowen et al. |
| 10,111,470 B2 | 10/2018 | Monsees et al. |
| 10,136,675 B2 | 11/2018 | Li et al. |
| 10,231,486 B2 | 3/2019 | Bowen et al. |
| 10,314,343 B2 | 6/2019 | Newcomb et al. |
| 10,505,383 B2 | 12/2019 | Sur |
| 10,687,553 B2 | 6/2020 | Kaufman et al. |
| 10,701,981 B2 | 7/2020 | Newcomb et al. |
| 10,709,173 B2 | 7/2020 | Monsees et al. |
| 10,757,976 B2 | 9/2020 | Mironov et al. |
| 10,952,473 B2 | 3/2021 | Bessant et al. |
| 11,013,268 B2 | 5/2021 | Bessant et al. |
| 11,660,403 B2 | 5/2023 | Atkins et al. |
| 2005/0034723 A1 | 2/2005 | Bennett et al. |
| 2008/0038363 A1 | 2/2008 | Zaffaroni et al. |
| 2010/0181387 A1 | 7/2010 | Zaffaroni et al. |
| 2016/0011134 A1* | 1/2016 | Kuemin .................. H05B 3/22 219/448.11 |
| 2016/0206006 A1 | 7/2016 | Li et al. |
| 2017/0079332 A1 | 3/2017 | Li et al. |
| 2017/0127728 A1 | 5/2017 | Li et al. |
| 2017/0196273 A1* | 7/2017 | Qiu ........................ A24F 40/44 |
| 2017/0231277 A1 | 8/2017 | Mironov et al. |
| 2017/0231278 A1 | 8/2017 | Mironov et al. |
| 2017/0280771 A1 | 10/2017 | Courbat et al. |
| 2018/0296777 A1 | 10/2018 | Terry et al. |
| 2020/0046028 A1* | 2/2020 | Oh ........................... H05B 3/46 |
| 2021/0145072 A1 | 5/2021 | Mullin et al. |
| 2021/0378307 A1* | 12/2021 | Reevell ................... A24F 40/70 |

FOREIGN PATENT DOCUMENTS

| | | |
|---|---|---|
| CN | 104621716 A | 5/2015 |
| CN | 104621717 A | 5/2015 |
| CN | 109789285 B | 5/2019 |
| CN | 110269282 A | 9/2019 |
| EP | 3413734 B1 | 12/2018 |
| EP | 3435794 B1 | 2/2019 |
| EP | 3481145 B1 | 5/2019 |
| EP | 3558038 B1 | 10/2019 |
| EP | 3589145 B1 | 1/2020 |
| JP | H1193 A | 1/1999 |
| TW | I751467 B | 5/2020 |
| WO | WO-2016154792 A1 | 10/2016 |
| WO | WO-2017137510 A1 | 8/2017 |
| WO | WO-2017139662 A1 | 8/2017 |
| WO | WO-2018048813 A1 | 3/2018 |
| WO | WO-2019122866 A1 | 6/2019 |

\* cited by examiner

VAPORIZER HEATER AND TEMPERATURE SENSING ELEMENT

CROSS-REFERENCE TO RELATED APPLICATION

The present application claims priority to U.S. Provisional Patent Application No. 62/749,009 entitled "Vaporizer Heater and Temperature Sensing Element" filed Oct. 22, 2018, which is hereby incorporated by reference in its entirety.

TECHNICAL FIELD

The subject matter described herein relates to vaporizer devices including a heating and temperature sensing assembly.

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

The term vaporizer device, as used herein consistent with the current subject matter, generally refers to portable, self-contained, devices that are convenient for personal use. Typically, such devices are controlled by one or more switches, buttons, touch sensitive devices, or other user input functionality or the like (which can be referred to generally as controls) on the vaporizer, although a number of devices that may wirelessly communicate with an external controller (e.g., a smartphone, a smart watch, other wearable electronic devices, etc.) have recently become available. Control, in this context, refers generally to an ability to influence one or more of a variety of operating parameters, which may include without limitation any of causing the heater to be turned on and/or off, adjusting a minimum and/or maximum temperature to which the heater is heated during operation, various games or other interactive features that a user might access on a device, and/or other operations.

SUMMARY

In certain aspects of the current subject matter, challenges associated with efficient and effective heating of a part of a vaporizer device for heating a vaporizable material can be addressed by inclusion of one or more of the features described herein or comparable/equivalent approaches as would be understood by one of ordinary skill in the art. Aspects of the current subject matter relate to systems and methods for a heating and temperature sensing element or assembly configured to heat a vaporizable material in a vaporizer device.

Aspects of the current subject matter relate to a heating and temperature sensing assembly of a vaporizer device configured to heat a vaporizable material. The heating and temperature sensing assembly may include a support plate made out of a thermally conductive material. The heating and temperature sensing assembly may include a heating element having a first electrically conductive pathway extending along the support plate. The heating element may be configured to heat the support plate for heating the vaporizable material. The heating and temperature sensing assembly may include a temperature sensing element having a second electrically conductive pathway extending along the support plate. The temperature sensing element may be configured to sense a temperature of the support plate.

In some variations, one or more of the following features may optionally be included in any feasible combination. In one aspect consistent with the current disclosure, the heating element may include a first electrode configured to conduct electric power from a power source to the first electrically conductive pathway and a second electrode configured to conduct electric power from the power source to the second electrically conductive pathway. The heating element may include a third electrode in electrical communication with the first electrically conductive pathway and the second electrically conductive pathway. In some embodiments, the first electrically conductive pathway may be separate from the second electrically conductive pathway. The temperature sensing element may include one or more of a thermistor, a thermocouple, and a resistance temperature detector. The heating element may be made out of one or more of a metal, an alloy, a nickel-chromium alloy, and a non-metallic resistor material. The heating element may be configured to increase in temperature when a current is passed along the first electrically conductive pathway. The heating and temperature sensing assembly may be positioned adjacent to or within an atomizer of the vaporizer device. The heating and temperature sensing assembly may be positioned within a cartridge of the vaporizer device. The cartridge may be configured to be releasably coupled to a vaporizer body of the vaporizer device. The heating and temperature sensing assembly may be positioned within a vaporizer body of the vaporizer device. The vaporizer body may be configured to releasably couple to a cartridge.

In an interrelated aspect, a vaporizer device may include a heating and temperature sensing assembly configured to heat a vaporizable material. The heating and temperature sensing assembly may include a support plate made out of a thermally conductive material. The heating and temperature sensing assembly may include a heating element having a first electrically conductive pathway extending along the support plate. The heating element may be configured to heat the support plate for heating the vaporizable material. The heating and temperature sensing assembly may include a temperature sensing element having a second electrically conductive pathway extending along the support plate. The temperature sensing element may be configured to sense a temperature of the support plate. The heating and temperature sensing assembly may include a controller in communication with the heating and temperature sensing assembly and may be configured to collect the temperature sensed by the temperature sensing element. The controller may be configured to control the heating element. In some embodiments, the controller may control the heating element based on the collected temperature.

In an interrelated aspect, a method of a vaporizer device may include heating a vaporizable material with a heating and temperature sensing assembly of the vaporizer device. The heating and temperature sensing assembly may include a support plate made out of a thermally conductive material. The heating and temperature sensing assembly may include a heating element having a first electrically conductive pathway extending along the support plate. The heating element may be configured to heat the support plate for heating the vaporizable material. The heating and temperature sensing assembly may include a temperature sensing element having a second electrically conductive pathway extending along the support plate. The temperature sensing element may be configured to sense a temperature of the support plate. The method of the vaporizer device may include sensing, by the temperature sensing element of the heating and temperature sensing assembly, a temperature of the support plate. The method of the vaporizer device may include controlling, based on the sensed temperature, a delivery of power to the heating and temperature sensing assembly.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
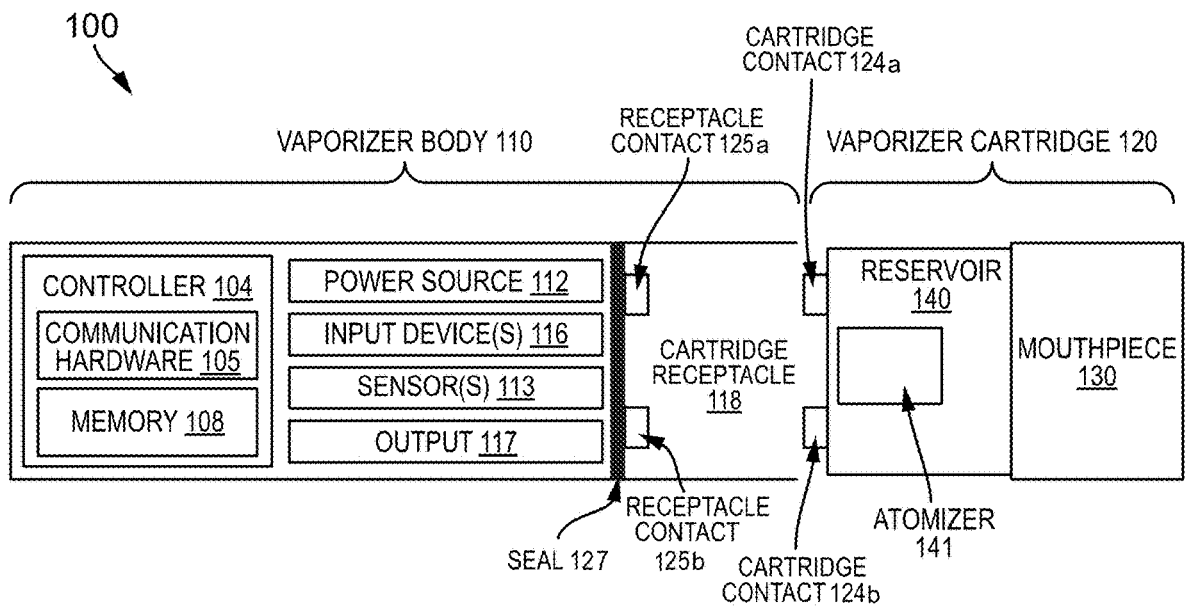
FIG. 1 illustrates a block diagram of a vaporizer consistent with implementations of the current subject matter.

Implementations of the current subject matter include methods, apparatuses, articles of manufacture, and systems relating to vaporization of one or more materials for inhalation by a user. Example implementations include vaporizer devices and systems including vaporizer devices. The term "vaporizer device" as used in the following description and claims refers to any of a self-contained apparatus, an apparatus that includes two or more separable parts (for example, a vaporizer body that includes a battery and other hardware, and a cartridge that includes a vaporizable material), and/or the like. A "vaporizer system," as used herein, can include one or more components, such as a vaporizer device. Examples of vaporizer devices consistent with implementations of the current subject matter include electronic vaporizers, electronic nicotine delivery systems (ENDS), and/or the like. In general, such vaporizer devices are hand-held devices that heat (such as by convection, conduction, radiation, and/or some combination thereof) a vaporizable material to provide an inhalable dose of the material.

The vaporizer device can include various embodiments of a heating and temperature sensing assembly, as described herein. For example, the heating and temperature sensing assembly can include a heater (which may include a resistance heating element) for heating and/or vaporizing vaporizable material. In order to effectively heat the vaporizable material, such as at an effective and beneficial temperature (e.g., a temperature that prevents or limits the formation of harmful byproducts, that is suitable for generating consistent aerosol, etc.), the heating and temperature sensing assembly may include a temperature sensing element that is configured to provide precise temperature measurements of the heating element and/or material adjacent the heating element. Various embodiments of the heating and temperature sensing assembly are described herein that provide heating functionality for efficiently achieving effective temperatures for vaporizing vaporizable material, as well as precise temperature sensing while achieving a compact configuration and cost effective manufacturing.

The vaporizable material used with a vaporizer device can be provided within a cartridge (for example, a part of the vaporizer that contains the vaporizable material in a reservoir or other container) which can be refillable when empty, or disposable such that a new cartridge containing additional vaporizable material of a same or different type can be used).

A vaporizer device can be a cartridge-using vaporizer device, a cartridge-less vaporizer device, or a multi-use vaporizer device capable of use with or without a cartridge. For example, a vaporizer device can include a heating chamber (for example, an oven or other region in which material is heated by a heating element) configured to receive a vaporizable material directly into the heating chamber, and/or a reservoir or the like for containing the vaporizable material. In some implementations, a vaporizer device can be configured for use with a liquid vaporizable material (for example, a carrier solution in which an active and/or inactive ingredient(s) are suspended or held in solution, or a liquid form of the vaporizable material itself), a paste, a wax, and/or a solid vaporizable material. A solid vaporizable material can include a plant material that emits some part of the plant material as the vaporizable material (for example, some part of the plant material remains as waste after the material is vaporized for inhalation by a user) or optionally can be a solid form of the vaporizable material itself, such that all of the solid material can eventually be vaporized for inhalation. A liquid vaporizable material can likewise be capable of being completely vaporized, or can include some portion of the liquid material that remains after all of the material suitable for inhalation has been vaporized.

Referring to the block diagram of FIG. 1, a vaporizer device 100 can include a power source 112 (for example, a battery, which can be a rechargeable battery), and a controller 104 (for example, a processor, circuitry, etc. capable of executing logic) for controlling delivery of heat to an atomizer 141 to cause a vaporizable material 102 to be converted from a condensed form (such as a solid, a liquid, a solution, a suspension, a part of an at least partially unprocessed plant material, etc.) to the gas phase. The controller 104 can be part of one or more printed circuit boards (PCBs) consistent with certain implementations of the current subject matter. After conversion of the vaporizable material 102 to the gas phase, at least some of the vaporizable material 102 in the gas phase can condense to form particulate matter in at least a partial local equilibrium with the gas phase as part of an aerosol, which can form some or all of an inhalable dose provided by the vaporizer device 100 during a user's puff or draw on the vaporizer device 100. It should be appreciated that the interplay between gas and condensed phases in an aerosol generated by a vaporizer device 100 can be complex and dynamic, due to factors such as ambient temperature, relative humidity, chemistry, flow conditions in airflow paths (both inside the vaporizer and in the airways of a human or other animal), and/or mixing of the vaporizable material 102 in the gas phase or in the aerosol phase with other air streams, which can affect one or more physical parameters of an aerosol. In some vaporizer devices, and particularly for vaporizer devices configured for delivery of volatile vaporizable materials, the inhalable dose can exist predominantly in the gas phase (for example, formation of condensed phase particles can be very limited).

The atomizer 141 in the vaporizer device 100 can be configured to vaporize a vaporizable material 102. The vaporizable material 102 can be a liquid. Examples of the vaporizable material 102 include neat liquids, suspensions, solutions, mixtures, and/or the like. The atomizer 141 can include a wicking element (i.e., a wick) configured to convey an amount of the vaporizable material 102 to a part of the atomizer 141 that includes a heating element (not shown in FIG. 1).

For example, the wicking element can be configured to draw the vaporizable material 102 from a reservoir 140 configured to contain the vaporizable material 102, such that the vaporizable material 102 can be vaporized by heat delivered from a heating element. The wicking element can also optionally allow air to enter the reservoir 140 and replace the volume of vaporizable material 102 removed. In some implementations of the current subject matter, capillary action can pull the vaporizable material 102 into the wick for vaporization by the heating element, and air can return to the reservoir 140 through the wick to at least partially equalize pressure in the reservoir 140. Other methods of allowing air back into the reservoir 140 to equalize pressure are also within the scope of the current subject matter.

As used herein, the terms "wick" or "wicking element" include any material capable of causing fluid motion via capillary pressure.

The heating element can include one or more of a conductive heater, a radiative heater, and/or a convective heater. One type of heating element is a resistive heating element, which can include a material (such as a metal or alloy, for example a nickel-chromium alloy, or a non-metallic resistor) configured to dissipate electrical power in the form of heat when electrical current is passed through one or more resistive segments of the heating element. In some implementations of the current subject matter, the atomizer 141 can include a heating element which includes a resistive coil or other heating element wrapped around, positioned within, integrated into a bulk shape of, pressed into thermal contact with, or otherwise arranged to deliver heat to a wicking element, to cause the vaporizable material 102 drawn from the reservoir 140 by the wicking element to be vaporized for subsequent inhalation by a user in a gas and/or a condensed (for example, aerosol particles or droplets) phase. Other wicking elements, heating elements, and/or atomizer assembly configurations are also possible.

Certain vaporizer devices may, additionally or alternatively, be configured to create an inhalable dose of the vaporizable material 102 in the gas phase and/or aerosol phase via heating of the vaporizable material 102. The vaporizable material 102 can be a solid-phase material (such as a wax or the like) or plant material (for example, tobacco leaves and/or parts of tobacco leaves). In such vaporizer devices, a resistive heating element can be part of, or otherwise incorporated into or in thermal contact with, the walls of an oven or other heating chamber into which the vaporizable material 102 is placed. Alternatively, a resistive heating element or elements can be used to heat air passing through or past the vaporizable material 102, to cause convective heating of the vaporizable material 102. In still other examples, a resistive heating element or elements can be disposed in intimate contact with plant material such that direct conductive heating of the plant material occurs from within a mass of the plant material, as opposed to only by conduction inward from walls of an oven.

The heating element can be activated in association with a user puffing (i.e., drawing, inhaling, etc.) on a mouthpiece 130 of the vaporizer device 100 to cause air to flow from an air inlet, along an airflow path that passes the atomizer 141 (i.e., wicking element and heating element). Optionally, air can flow from an air inlet through one or more condensation areas or chambers, to an air outlet in the mouthpiece 130. Incoming air moving along the airflow path moves over or through the atomizer 141, where vaporizable material 102 in the gas phase is entrained into the air. The heating element can be activated via the controller 104, which can optionally be a part of a vaporizer body 110 as discussed herein, causing current to pass from the power source 112 through a circuit including the resistive heating element, which is optionally part of a vaporizer cartridge 120 as discussed herein. As noted herein, the entrained vaporizable material 102 in the gas phase can condense as it passes through the remainder of the airflow path such that an inhalable dose of the vaporizable material 102 in an aerosol form can be delivered from the air outlet (for example, the mouthpiece 130) for inhalation by a user.

Activation of the heating element can be caused by automatic detection of a puff based on one or more signals generated by one or more of a sensor 113. The sensor 113 and the signals generated by the sensor 113 can include one or more of: a pressure sensor or sensors disposed to detect pressure along the airflow path relative to ambient pressure (or optionally to measure changes in absolute pressure), a motion sensor or sensors (for example, an accelerometer) of the vaporizer device 100, a flow sensor or sensors of the vaporizer device 100, a capacitive lip sensor of the vaporizer device 100, detection of interaction of a user with the vaporizer device 100 via one or more input devices 116 (for example, buttons or other tactile control devices of the vaporizer device 100), receipt of signals from a computing device in communication with the vaporizer device 100, and/or via other approaches for determining that a puff is occurring or imminent.

As discussed herein, the vaporizer device 100 consistent with implementations of the current subject matter can be configured to connect (such as, for example, wirelessly or via a wired connection) to a computing device (or optionally two or more devices) in communication with the vaporizer device 100. To this end, the controller 104 can include communication hardware 105. The controller 104 can also include a memory 108. The communication hardware 105 can include firmware and/or can be controlled by software for executing one or more cryptographic protocols for the communication.

A computing device can be a component of a vaporizer system that also includes the vaporizer device 100, and can include its own hardware for communication, which can establish a wireless communication channel with the communication hardware 105 of the vaporizer device 100. For example, a computing device used as part of a vaporizer system can include a general-purpose computing device (such as a smartphone, a tablet, a personal computer, some other portable device such as a smartwatch, or the like) that executes software to produce a user interface for enabling a user to interact with the vaporizer device 100. In other implementations of the current subject matter, such a device used as part of a vaporizer system can be a dedicated piece of hardware such as a remote control or other wireless or wired device having one or more physical or soft (i.e., configurable on a screen or other display device and selectable via user interaction with a touch-sensitive screen or some other input device like a mouse, pointer, trackball, cursor buttons, or the like) interface controls. The vaporizer device 100 can also include one or more outputs 117 or devices for providing information to the user. For example, the outputs 117 can include one or more light emitting diodes (LEDs) configured to provide feedback to a user based on a status and/or mode of operation of the vaporizer device 100.

In the example in which a computing device provides signals related to activation of the resistive heating element, or in other examples of coupling of a computing device with the vaporizer device 100 for implementation of various control or other functions, the computing device executes one or more computer instruction sets to provide a user interface and underlying data handling. In one example, detection by the computing device of user interaction with one or more user interface elements can cause the computing device to signal the vaporizer device 100 to activate the heating element to reach an operating temperature for creation of an inhalable dose of vapor/aerosol. Other functions of the vaporizer device 100 can be controlled by interaction of a user with a user interface on a computing device in communication with the vaporizer device 100.

The temperature of a resistive heating element of the vaporizer device 100 can depend on a number of factors, including an amount of electrical power delivered to the resistive heating element and/or a duty cycle at which the electrical power is delivered, conductive heat transfer to other parts of the electronic vaporizer device 100 and/or to the environment, latent heat losses due to vaporization of the vaporizable material 102 from the wicking element and/or the atomizer 141 as a whole, and convective heat losses due to airflow (i.e., air moving across the heating element or the atomizer 141 as a whole when a user inhales on the vaporizer device 100).

As discussed above, vaporizers for use with liquid vaporizable materials typically include an atomizer (e.g., located in the vaporizer body or cartridge) in which a wick conveys an amount of a liquid vaporizable material to a part of the atomizer that includes a heating element. Atomizers are used to evaporate liquid vaporizable material into aerosol and can include a heating element that may require precise temperature control to generate consistent inhalable aerosol and to prevent the liquid vaporizable material from overheating. In some implementations, the heating element can be relatively small (e.g., a few millimeters along a length and/or width) and include a heating wire shaped as a coil, which can pose a significant challenge in measuring the surface temperature of the heating element. For example, the temperature may vary along a length of the heating wire coil and it can be difficult to sense the variations in temperature along the length at least because of the complexity in shape (e.g., helical coil).

Various embodiments of a heating and temperature sensing assembly are described in detail below that provide heating functionality for achieving effective temperatures for vaporizing vaporizable material, as well as provide precise temperature sensing to ensure appropriate temperatures are reached and maintained. The heating and temperature sensing assemblies described herein can be included in an atomizer that can be a part of a vaporizer body or cartridge of a vaporizer. The heating and temperature sensing assemblies described herein may also achieve a compact configuration and cost effective manufacturing. Additionally, the heating and temperature sensing assemblies described herein may include a heating element and a temperature sensing element having a desired temperature coefficient of resistance (TCR).

Various heating and temperature sensing assemblies for a vaporizer are described below that include a heating element and a temperature sensing element. The heating element can be configured to dissipate electrical power in the form of heat, such as when electrical current is passed through one or more resistive segments of the heating element. The temperature sensing element can include an electrically conductive material, such as copper. In some embodiments, the heating and temperature sensing assembly can be in communication with a controller (e.g., controller 104) of the vaporizer, as will be described in greater detail below. Other variations of the heating element and temperature sensing element are within the scope of this disclosure. Additionally, the temperature sensing element and the heating element may be mounted onto a thermally conductive material, such as a metal or alloy.

One approach for determining the temperature of a heating element includes measuring or otherwise monitoring changes in the resistance of the heating element. For this purpose, the heating element can be made out of one or more metals that exhibit a positive temperature coefficient of resistance (TCR). For example, the controller of the vaporizer can include a temperature control circuit that can measure the change in resistance ($\Delta R$) in reference to the a starting resistance of the heating element, prior to applying power to the heating element. As the temperature increases, the bulk resistance of the heating element may also increase.

Figure 2:
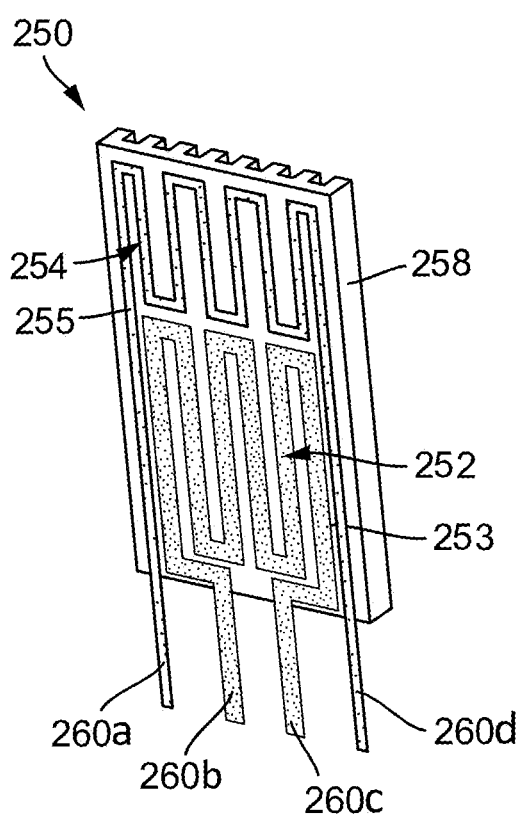
FIG. 2 illustrates an embodiment of a heating and temperature sensing assembly including four electrodes consistent with implementations of the current subject matter.
Figure 3:
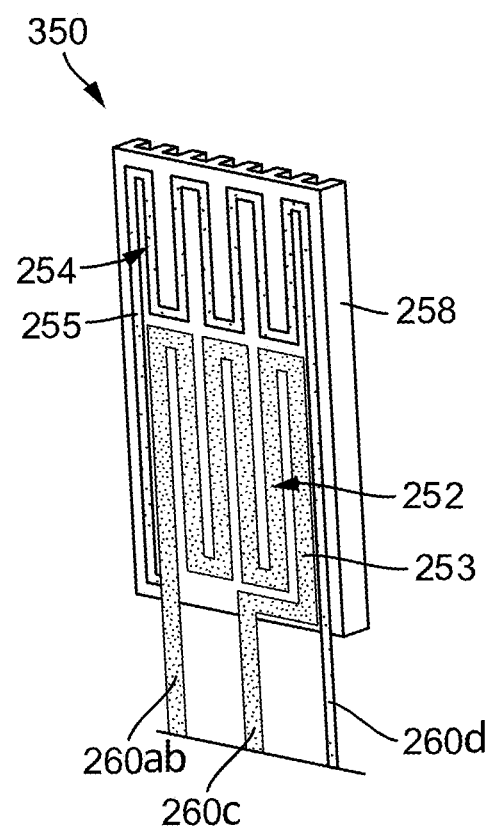
FIG. 3 illustrates another embodiment of a heating and temperature sensing assembly including three electrodes consistent with implementations of the current subject matter.

FIGS. 2 and 3 illustrate embodiments of a heating and temperature sensing assembly 250 and 350, respectively, which include a heating element 252 and a temperature sensing element 254. As shown in FIGS. 2 and 3, the heating element 252 can include a first electrically conductive pathway 253 that extends along at least a first side of a support plate 258 made out of a thermally conductive material to form a heater. As shown in FIGS. 2 and 3, the first electrically conductive pathway 253 of the heating element 252 can include a trace or a die cut of a flat electrically conductive material that is attached to the support plate 258. For example, the heating element 252 can be made out of a material (e.g., a metal or alloy, for example a nickel-chromium alloy, or a non-metallic resistor) configured to dissipate electrical power in the form of heat when electrical current is passed along the heating element 252, such as when current is passed through one or more resistive segments of the heating element 252. As such, when the heating element 252 increases in temperature, the support plate 258 can be caused to also increase in temperature.

In some embodiments, the support plate 258 can be positioned in an atomizer to allow the support plate 258 and/or the heating element 252 to directly or indirectly contact vaporizable material (e.g., liquid vaporizable material) for heating the vaporizable material (e.g., to form an inhalable aerosol). The heating element 252 can extend along parts of the support plate to achieve various heating characteristics of the support plate 258. In some embodiments, the heating element 252 may include two electrodes 260b, 260c for conducting electrical power from a power source (e.g., power source 112).

The temperature sensing element 254 can include a second electrically conductive pathway 255 that extends along the support plate 258, such as along the same side of the support plate 258 as the first electrically conductive pathway 253, as shown in FIGS. 2 and 3. The second electrically conductive pathway 255 can include an electrically conductive (e.g., metallic) trace or a die cut of electrically conductive material that is thermally attached to the heating element 252 and/or support plate 258. For example, the second electrically conductive pathway 255 can extend along parts of the support plate 258 that allow for effectively sensing important temperatures (e.g., areas of the support plate 258 that become heated for heating vaporizable material). In some embodiments, the temperature sensing element 254 can include resistance temperature detectors (RTDs) for sensing temperatures adjacent the temperature sensing element 254. For example, the temperature sensing element 254 can be in close proximity to the heating element 252, as well as contact the same support plate 258 as the heating element 252 thereby allowing the temperature sensing element 254 to efficiently and effectively sense temperatures produced by the heating element 252. Such temperatures can also be in contact with vaporizable material, thus allowing the temperature sensing element 254 to efficiently and effectively sense what temperatures the vaporizable material may reach and/or be in contact with. As will be discussed further below, a controller or control circuit of the vaporizer can receive the sensed temperatures for analyzing and controlling the heating element 252.

The temperature sensing element 254 and the heating element 252 may be made of the same material (e.g., copper) or from different materials and may have the same or different thicknesses, dimensions, and/or shapes. For example, the dimensions of the heating element 252 may vary depending on the material used and the configuration of the heating element 252. For example, the heating element 252 can be sized and shaped to reduce power loss and achieve efficient preheat time, such as having a length of approximately 2 mm to approximately 4 mm, a width of approximately 1 mm to approximately 2 mm, and a thickness of approximately 0.2 mm to approximately 1 mm. Other shapes and sizes are within the scope of this disclosure.

As shown in FIG. 2, some embodiments of the heating and temperature sensing assembly 250 can include the temperature sensing element 254 and the heating element 252 having separate electrical connections and pathways. As such, the heating and temperature sensing assembly 250 can include two terminals or electrodes 260b, 260c coupled to the first electrically conductive pathway 253 of the heating element 252 and two terminals or electrodes 260a, 260d coupled to the second electrically conductive pathway 255 of the temperature sensing element 254.

As shown in FIG. 3, some embodiments of the heating and temperature sensing assembly 350 can include the heating element 252 and the temperature sensing element 254 sharing a common electrical connection. For example, the input electrode (e.g., electrode 260d) to the temperature sensing element 254 can be separate from the input electrode (e.g., electrode 260c) to the heating element 252 to eliminate parasitic voltages generated in the power path of the heating element 252. The output electrode (e.g., electrode 260ab) of the temperature sensing element 254 and the heating element 252 can be shared, as shown in FIG. 3.

In some embodiments, the heating and temperature sensing assembly 250, 350 can be in communication with a controller (e.g., controller 104) of the vaporization device (e.g., vaporizer device 100). For example, the controller can receive sensed temperature readings from the temperature sensing element 254. Additionally, the controller can control the heating element 252 (e.g., allow and prevent power delivery to the heating element 252), such as based on the received temperature readings. In some embodiments, the controller can include a pre-programmed acceptable temperature range against which the received temperature readings can be compared against. For example, if the received temperature readings are outside of the pre-programmed acceptable temperature range, the controller can adjust a power delivery to the heating element 252.

In addition to resolving the shortcomings of a single heating element for temperature control, the heating and temperature sensing assembly 250, 350 may provide at least one or more benefits by utilizing materials with higher TCR, tighter tolerances and improved stability, such as, for example, improved thermal control due to tighter TCR tolerances; improved thermal control due to higher TCR; improved stability over environmental conditions and aging, due to utilizing stable materials; improved linearity; improved part-to-part variability; and improved temperature control at the area of interest.

For example, some embodiments of the heating and temperature sensing assembly 250, 350 include a material having a TCR of approximately 160 ppm (e.g., Nichrome (NiCr) coil), such as for forming a part of the heating element 252. In some embodiments, one or more of the following materials can be included in the heating and temperature sensing assembly 250, 350: stainless steel, Nickel, copper and aluminum, any of which can have a TCR of approximately 3000 ppm to approximately 6000 ppm. Such materials having higher TCR can be used, for example, to form a part of the temperature sensing element 254 and can provide higher signals for achieving greater temperature sensing and control and/or simplifying the electronics of the control circuit. In some embodiments, a material with a higher TCR can be used for the electrically conductive pathway 255 of the temperature sensing element 254 (and not for the heating element 252), the material with the higher TCR may not affect the heating time and/or the required battery operating voltage range.

Other variations and embodiments of the heating and temperature sensing assembly 250, 350 are within the scope of this disclosure. For example, some embodiments of the temperature sensing element 254 of the heating and temperature sensing assembly 250, 350 can include one or more of a thermistor or a thermocouple, such as instead of resistance temperature detectors (RTDs) for temperature sensing. For example, the thermistor component may be deposited on a surface of the heating element 252 or embedded within the heating element (e.g., within the thermally conductive material of the support plate 258). Traces for connecting the thermistor to a controller or control circuit may also be deposited, edged, or printed on the surface of the heating element 252. For example, thin-film, disk thermistor or bead type thermistors may be used. Encapsulation of a bare thermistor within the heating element 252 or encapsulating the thermistor with glass or high temperature plastics (e.g., polyimide) may be used as protection from the environment or from aggressive agents.

Additionally or alternatively, some embodiments of the heating and temperature sensing assembly 250, 350 can include a thermocouple including a thermocouple junction deposited on the surface of the heating element or embedded within the heating element (e.g., within the support plate 258) with electrodes connecting to an AFE (Analog Front End) for achieving signal conditioning and cold junction compensation in order, which can produce adequate signal to the controller or control circuit. Other heating and temperature sensing assembly embodiments are within the scope of this disclosure.

As noted herein, to reliably activate the heating element or heat the heating element to a desired temperature, the vaporizer device 100 may, in some implementations of the current subject matter, make use of signals from the sensor 113 (for example, a pressure sensor) to determine when a user is inhaling. The sensor 113 can be positioned in the airflow path and/or can be connected (for example, by a passageway or other path) to an airflow path containing an inlet for air to enter the vaporizer device 100 and an outlet via which the user inhales the resulting vapor and/or aerosol such that the sensor 113 experiences changes (for example, pressure changes) concurrently with air passing through the vaporizer device 100 from the air inlet to the air outlet. In some implementations of the current subject matter, the heating element can be activated in association with a user's puff, for example by automatic detection of the puff, or by the sensor 113 detecting a change (such as a pressure change) in the airflow path.

The sensor 113 can be positioned on or coupled to (i.e., electrically or electronically connected, either physically or via a wireless connection) the controller 104 (for example, a printed circuit board assembly or other type of circuit board). To take measurements accurately and maintain durability of the vaporizer device 100, it can be beneficial to provide a seal 127 resilient enough to separate an airflow path from other parts of the vaporizer device 100. The seal 127, which can be a gasket, can be configured to at least partially surround the sensor 113 such that connections of the sensor 113 to the internal circuitry of the vaporizer device 100 are separated from a part of the sensor 113 exposed to the airflow path. In an example of a cartridge-based vaporizer, the seal 127 can also separate parts of one or more electrical connections between the vaporizer body 110 and the vaporizer cartridge 120. Such arrangements of the seal 127 in the vaporizer device 100 can be helpful in mitigating against potentially disruptive impacts on vaporizer components resulting from interactions with environmental factors such as water in the vapor or liquid phases, other fluids such as the vaporizable material 102, etc., and/or to reduce the escape of air from the designated airflow path in the vaporizer device 100. Unwanted air, liquid or other fluid passing and/or contacting circuitry of the vaporizer device 100 can cause various unwanted effects, such as altered pressure readings, and/or can result in the buildup of unwanted material, such as moisture, excess vaporizable material 102, etc., in parts of the vaporizer device 100 where they can result in poor pressure signal, degradation of the sensor 113 or other components, and/or a shorter life of the vaporizer device 100. Leaks in the seal 127 can also result in a user inhaling air that has passed over parts of the vaporizer device 100 containing, or constructed of, materials that may not be desirable to be inhaled.

In some implementations, the vaporizer body 110 includes the controller 104, the power source 112 (for example, a battery), one more of the sensor 113, charging contacts (such as those for charging the power source 112), the seal 127, and a cartridge receptacle 118 configured to receive the vaporizer cartridge 120 for coupling with the vaporizer body 110 through one or more of a variety of attachment structures. In some examples, the vaporizer cartridge 120 includes the reservoir 140 for containing the vaporizable material 102, and the mouthpiece 130 has an aerosol outlet for delivering an inhalable dose to a user. The vaporizer cartridge 120 can include the atomizer 141 having a wicking element and a heating element. Alternatively, one or both of the wicking element and the heating element can be part of the vaporizer body 110. In implementations in which any part of the atomizer 141 (i.e., heating element and/or wicking element) is part of the vaporizer body 110, the vaporizer device 100 can be configured to supply the vaporizable material 102 from the reservoir 140 in the vaporizer cartridge 120 to the part(s) of the atomizer 141 included in the vaporizer body 110.

Cartridge-based configurations for the vaporizer device 100 that generate an inhalable dose of a vaporizable material 102 that is not a liquid, via heating of a non-liquid material, are also within the scope of the current subject matter. For example, the vaporizer cartridge 120 can include a mass of a plant material that is processed and formed to have direct contact with parts of one or more resistive heating elements, and the vaporizer cartridge 120 can be configured to be coupled mechanically and/or electrically to the vaporizer body 110 that includes the controller 104, the power source 112, and one or more receptacle contacts 125*a* and 125*b* configured to connect to one or more corresponding cartridge contacts 124 and 124*b* and complete a circuit with the one or more resistive heating elements.

In an embodiment of the vaporizer device 100 in which the power source 112 is part of the vaporizer body 110, and a heating element is disposed in the vaporizer cartridge 120 and configured to couple with the vaporizer body 110, the vaporizer device 100 can include electrical connection features (for example, means for completing a circuit) for completing a circuit that includes the controller 104 (for example, a printed circuit board, a microcontroller, or the like), the power source 112, and the heating element (for example, a heating element within the atomizer 141). These features can include one or more contacts (referred to herein as cartridge contacts 124 and 124*b*) on a bottom surface of the vaporizer cartridge 120 and at least two contacts (referred to herein as receptacle contacts 125*a* and 125*b*) disposed near a base of the cartridge receptacle 118 of the vaporizer device 100 such that the cartridge contacts 124 and 124*b* and the receptacle contacts 125*a* and 125*b* make electrical connections when the vaporizer cartridge 120 is inserted into and coupled with the cartridge receptacle 118. The circuit completed by these electrical connections can allow delivery of electrical current to a heating element and can further be used for additional functions, such as measuring a resistance of the heating element for use in determining and/or controlling a temperature of the heating element based on a thermal coefficient of resistivity of the heating element.

In some implementations of the current subject matter, the cartridge contacts 124 and 124*b* and the receptacle contacts 125a and 125b can be configured to electrically connect in either of at least two orientations. In other words, one or more circuits necessary for operation of the vaporizer device 100 can be completed by insertion of the vaporizer cartridge 120 into the cartridge receptacle 118 in a first rotational orientation (around an axis along which the vaporizer cartridge 120 is inserted into the cartridge receptacle 118 of the vaporizer body 110) such that the cartridge contact 124a is electrically connected to the receptacle contact 125a and the cartridge contact 124b is electrically connected to the receptacle contact 125b. Furthermore, the one or more circuits necessary for operation of the vaporizer device 100 can be completed by insertion of the vaporizer cartridge 120 in the cartridge receptacle 118 in a second rotational orientation such cartridge contact 124a is electrically connected to the receptacle contact 125b and cartridge contact 124b is electrically connected to the receptacle contact 125a.

In one example of an attachment structure for coupling the vaporizer cartridge 120 to the vaporizer body 110, the vaporizer body 110 includes one or more detents (for example, dimples, protrusions, etc.) protruding inwardly from an inner surface of the cartridge receptacle 118, additional material (such as metal, plastic, etc.) formed to include a portion protruding into the cartridge receptacle 118, and/or the like. One or more exterior surfaces of the vaporizer cartridge 120 can include corresponding recesses (not shown in FIG. 1) that can fit and/or otherwise snap over such detents or protruding portions when the vaporizer cartridge 120 is inserted into the cartridge receptacle 118 on the vaporizer body 110. When the vaporizer cartridge 120 and the vaporizer body 110 are coupled (e.g., by insertion of the vaporizer cartridge 120 into the cartridge receptacle 118 of the vaporizer body 110), the detents or protrusions of the vaporizer body 110 can fit within and/or otherwise be held within the recesses of the vaporizer cartridge 120, to hold the vaporizer cartridge 120 in place when assembled. Such an assembly can provide enough support to hold the vaporizer cartridge 120 in place to ensure good contact between the cartridge contacts 124 and 124b and the receptacle contacts 125a and 125b, while allowing release of the vaporizer cartridge 120 from the vaporizer body 110 when a user pulls with reasonable force on the vaporizer cartridge 120 to disengage the vaporizer cartridge 120 from the cartridge receptacle 118.

In some implementations, the vaporizer cartridge 120, or at least an insertable end of the vaporizer cartridge 120 configured for insertion in the cartridge receptacle 118, can have a non-circular cross section transverse to the axis along which the vaporizer cartridge 120 is inserted into the cartridge receptacle 118. For example, the non-circular cross section can be approximately rectangular, approximately elliptical (i.e., have an approximately oval shape), non-rectangular but with two sets of parallel or approximately parallel opposing sides (i.e., having a parallelogram-like shape), or other shapes having rotational symmetry of at least order two. In this context, approximate shape indicates that a basic likeness to the described shape is apparent, but that sides of the shape in question need not be completely linear and vertices need not be completely sharp. Rounding of both or either of the edges or the vertices of the cross-sectional shape is contemplated in the description of any non-circular cross section referred to herein.

The cartridge contacts 124a and 124b and the receptacle contacts 125a and 125b can take various forms. For example, one or both sets of contacts can include conductive pins, tabs, posts, receiving holes for pins or posts, or the like. Some types of contacts can include springs or other features to facilitate better physical and electrical contact between the contacts on the vaporizer cartridge 120 and the vaporizer body 110. The electrical contacts can optionally be gold-plated, and/or include other materials.

Terminology

When a feature or element is herein referred to as being "on" another feature or element, it can be directly on the other feature or element or intervening features and/or elements can also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements can be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature can have portions that overlap or underlie the adjacent feature.

Terminology used herein is for the purpose of describing particular embodiments and implementations only and is not intended to be limiting. For example, as used herein, the singular forms "a," "an," and "the" are intended to include the plural forms as well, unless the context clearly indicates otherwise.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device can be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers can be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value can have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes can be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Use of the term "based on," herein and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described herein can be directed to various combinations and subcombinations of the disclosed features and/or combinations and subcombinations of several further features disclosed herein. In addition, the logic flows depicted in the accompanying figures and/or described herein do not necessarily require the particular order shown, or sequential order, to achieve desirable results. Other implementations may be within the scope of the following claims.

What is claimed is:

1. A heating and temperature sensing assembly of a vaporizer device configured to heat a vaporizable material, the heating and temperature sensing assembly comprising:
    a single support plate made out of a thermally conductive material, the single support plate comprising a first side and a second side opposing the first side, the single support plate being positioned within an atomizer to thereby allow the first side of the support plate to be in direct contact with the vaporizable material;
    a heating element including a first electrically conductive pathway attached to and extending along the first side of the single support plate, the heating element comprising a first trace or die cut of a first electrically conductive material attached to the first side of the single support plate, the heating element configured to heat the single support plate for heating the vaporizable material; and
    a temperature sensing element including a second electrically conductive pathway attached to and extending along the first side of the single support plate, the temperature sensing element comprising a second trace or die cut of a second electrically conductive material that is thermally attached to the heating element and the first side of the single support plate, the temperature sensing element configured to sense a temperature of at least one of the first side of the single support plate and the vaporizable material;
    wherein the temperature sensing element at least partially surrounds the heating element.

2. The heating and temperature sensing assembly of claim 1, wherein the heating element includes a first electrode configured to conduct electric power from a power source to the first electrically conductive pathway and the temperature sensing element includes a second electrode configured to conduct electric power from the power source to the second electrically conductive pathway.

3. The heating and temperature sensing assembly of claim 2, further comprising a third electrode in electrical communication with the first electrically conductive pathway and the second electrically conductive pathway, the third electrode coupled to the first side of the single support plate and providing a shared common electrical connection between the heating element and the temperature sensing element, wherein the shared common electrical connection is an output electrode.

4. The heating and temperature sensing assembly of claim 1, wherein at least a part of the first electrically conductive pathway is separate from the second electrically conductive pathway.

5. The heating and temperature sensing assembly of claim 1, wherein the temperature sensing element includes one or more of a thermistor, a thermocouple, and a resistance temperature detector.

6. The heating and temperature sensing assembly of claim 1, wherein the heating element is made out of one or more of a metal, an alloy, a nickel-chromium alloy, and a non-metallic resistor material.

7. The heating and temperature sensing assembly of claim 1, wherein the heating element is configured to increase in temperature when a current is passed along the first electrically conductive pathway thereby heating the vaporizable material and the single support plate, the temperature sensing element positioned adjacent the heating element to allow the temperature sensing element to sense a temperature of the heated vaporizable material that is adjacent the heating element.

8. The heating and temperature sensing assembly of claim 1, wherein the heating and temperature sensing assembly is positioned within a cartridge of the vaporizer device.

9. The heating and temperature sensing assembly of claim 8, wherein the cartridge is configured to be releasably coupled to a vaporizer body of the vaporizer device.

10. The heating and temperature sensing assembly of claim 1, wherein the heating and temperature sensing assembly is positioned within a vaporizer body of the vaporizer device, the vaporizer body being configured to releasably couple to a cartridge.

11. A vaporizer device, comprising:
    a heating and temperature sensing assembly configured to heat a vaporizable material, the heating and temperature sensing assembly comprising:
    a single support plate made out of a thermally conductive material, the single support plate comprising a first side and a second side opposing the first side, the single support plate being positioned within an atomizer to thereby allow the first side of the support plate to be in direct contact with the vaporizable material;
    a heating element including a first electrically conductive pathway attached to and extending along the first side of the single support plate, the heating element comprising a first trace or die cut of a first electrically conductive material attached to the first side of the single support plate, the heating element configured to heat the single support plate for heating the vaporizable material; and
    a temperature sensing element including a second electrically conductive pathway attached to and extending along the first side of the single support plate, the temperature sensing element comprising a second trace or die cut of a second electrically conductive material that is thermally attached to the heating element and the first side of the single support plate, the temperature sensing element configured to sense a temperature of at least one of the first side of the single support plate and the vaporizable material;
    wherein the temperature sensing element at least partially surrounds the heating element; and
    a controller in communication with the heating and temperature sensing assembly and configured to collect the temperature sensed by the temperature sensing element, the controller further configured to control the heating element.

12. The vaporizer device of claim 11, wherein the controller controls the heating element based on the collected temperature.

13. The vaporizer device of claim 11, wherein the heating element includes a first electrode configured to conduct electric power from a power source to the first electrically conductive pathway and the temperature sensing element includes a second
   electrode configured to conduct electric power from the power source to the second electrically conductive pathway.

14. The vaporizer device of claim 13, further comprising a third electrode in electrical communication with the first electrically conductive pathway and the second electrically conductive pathway, the third electrode coupled to the first side of the single support plate and providing a shared common electrical connection between the heating element and the temperature sensing element, wherein the shared common electrical connection is an output electrode.

15. The vaporizer device of claim 11, wherein at least a part of the first electrically conductive pathway is separate from the second electrically conductive pathway.

16. The vaporizer device of claim 11, further comprising a cartridge containing the vaporizable material and the heating and temperature sensing assembly.

17. The vaporizer device of claim 11, wherein the vaporizer device includes a vaporizer body containing the heating and temperature sensing assembly, the vaporizer body being configured to releasably couple to a cartridge.

18. A method of operating a vaporizer device, comprising:
   heating a vaporizable material with a heating and temperature sensing assembly of the vaporizer device, the heating and temperature sensing assembly comprising:
   a single support plate made out of a thermally conductive material, the single support plate comprising a first side and a second side opposing the first side, the single support plate being positioned within an atomizer to thereby allow the first side of the support plate to be in direct contact with the vaporizable material;
   a heating element including a first electrically conductive pathway attached to and extending along the first side of the single support plate, the heating element comprising a first trace or die cut of a first electrically conductive material attached to the first side of the single support plate, the heating element configured to heat the single support plate for heating the vaporizable material; and
   a temperature sensing element including a second electrically conductive pathway attached to and extending along the first side of the single support plate, the temperature sensing element comprising a second trace or die cut of a second electrically conductive material that is thermally attached to the heating element and the first side of the single support plate, the temperature sensing element configured to sense a temperature of one or more of the first side of the single support plate and the vaporizable material;
   wherein the temperature sensing element at least partially surrounds the heating element; and
   sensing, by the temperature sensing element of the heating and temperature sensing assembly, a temperature of at least one of the first side of the single support plate and the vaporizable material.

19. The method of claim 18, further comprising:
controlling, based on the sensed temperature, a delivery of power to the heating and temperature sensing assembly.

* * * * *